United States Patent
Groeger et al.

[11] Patent Number: 5,923,624
[45] Date of Patent: Jul. 13, 1999

[54] RADIO RECEIVER INCLUDING A RECORDING UNIT FOR AUDIO DATA

[75] Inventors: Klaus-Erwin Groeger, Diekholzen; Peter Tuschik, Wendhausen, both of Germany

[73] Assignee: Robert Bosch GmbH, Stuttgart, Germany

[21] Appl. No.: 08/939,598

[22] Filed: Sep. 29, 1997

[30] Foreign Application Priority Data

Sep. 28, 1996 [DE] Germany .................. 196 40 140

[51] Int. Cl.[6] ........................................... H04H 9/00
[52] U.S. Cl. ........................................... 369/7
[58] Field of Search ................... 369/7, 6, 10, 11, 369/12, 1, 2, 5; 455/95, 99

[56] References Cited

U.S. PATENT DOCUMENTS

| | | | |
|---|---|---|---|
| 4,342,106 | 7/1982 | Sato et al. | 369/7 |
| 4,713,801 | 12/1987 | Hale | 369/7 |
| 5,263,199 | 11/1993 | Barnes et al. | 369/7 |
| 5,459,702 | 10/1995 | Greenspan | 369/7 |

*Primary Examiner*—Tan Dinh
*Attorney, Agent, or Firm*—Kenyon & Kenyon

[57] ABSTRACT

A car radio having a removable operating part and a recording unit for audio signals, the recording unit being arranged in the operating part. A microphone connected to the recording unit and arranged in the operating part can record audio signals when the operating part is removed so that it can be used, for example, as a dictation device. The removed operating part is powered via a battery housed in the operating part.

11 Claims, 1 Drawing Sheet

RADIO RECEIVER INCLUDING A RECORDING UNIT FOR AUDIO DATA

FIELD OF THE INVENTION

The present invention relates to a radio receiver having a recording unit for recording audio data.

BACKGROUND INFORMATION

German Patent Application No. A-37 21 279 describes a radio receiver which records traffic announcements in a digital speech memory upon receiving identifier signals which accompany the traffic messages. The identifier signals are known as announcement identifiers and once the traffic announcements are recorded, they are constantly available for playback. In this known radio receiver, only information received via a transmitter that is set to the receiver unit can be stored.

Moreover, car radios are known that have, for the sake of theft prevention, an operating part which can be removed from the car radio and which contains the operating elements of the car radio. When the user leaves the vehicle, the car radio is made unusable by removing the operating part since operation of the car radio without the associated operating elements is impossible.

SUMMARY OF THE INVENTION

The radio receiver according to the present invention has the advantage that through integration of a speech recording unit into a removable operating part of a car radio, it is usable as a dictation device.

Moreover, it is advantageous to connect the operating part of the radio receiver to the radio receiver or to a separate playback unit for playback of the recorded information since in this manner the components required for playback as well as the energy consumption required for operation of the playback unit can be saved. The latter enables the use of a less powerful and thus smaller and lighter battery for powering the operating part removed from the car radio.

Moreover, according to an embodiment of the present invention it is advantageous to provide different memory areas in the recording unit for speech recordings from a radio program, particularly traffic messages, and for audio data recorded via the microphone. This enables separate further processing of the recorded information, and unintentional "recording over" one information type by another is easily avoided. When increased memory space is required, it is also advantageous if the separation of the two memory areas can be canceled. For example, upon cancellation, the entire available memory could be used for dictation.

If the operating part does not have its own playback unit, it is particularly advantageous to initially store the recorded signals section-by-section in a buffer memory and then transfer the signals to the memory only if no corrections are necessary. For example, if corrections are necessary during dictation, the section to be corrected is erased in the buffer memory and dictated again. In this manner, a playback unit is rendered superfluous.

Finally, according to an embodiment of the present invention, it is advantageous to use the display normally integrated into the operating part in a car radio to display, for example, either the memory capacity occupied by a dictation, or the remaining free memory capacity.

DETAILED DESCRIPTION OF THE INVENTION

The present invention is described hereafter using the example of a car radio; however, the present invention can also be implemented in conjunction with customary radio receivers.

Figure 1:
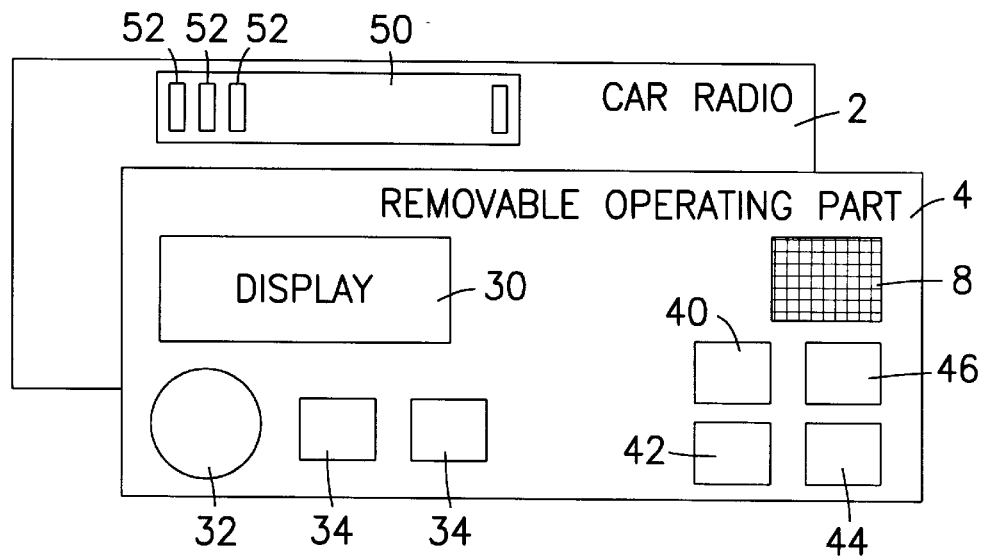
FIG. 1 illustrates a radio receiver according to an exemplary embodiment of the present invention having a removable operating part.

FIG. 1 shows a car radio 2 having a removable operating part 4. A contact strip 50 with contacts 52 provides a connection between operating part 4 and car radio 2 when operating part 4 is attached. Contact springs on the back side of operating part 4 are not shown. These springs are, for example, pressed onto contact surfaces 22 when the operating part is attached.

Figure 2:
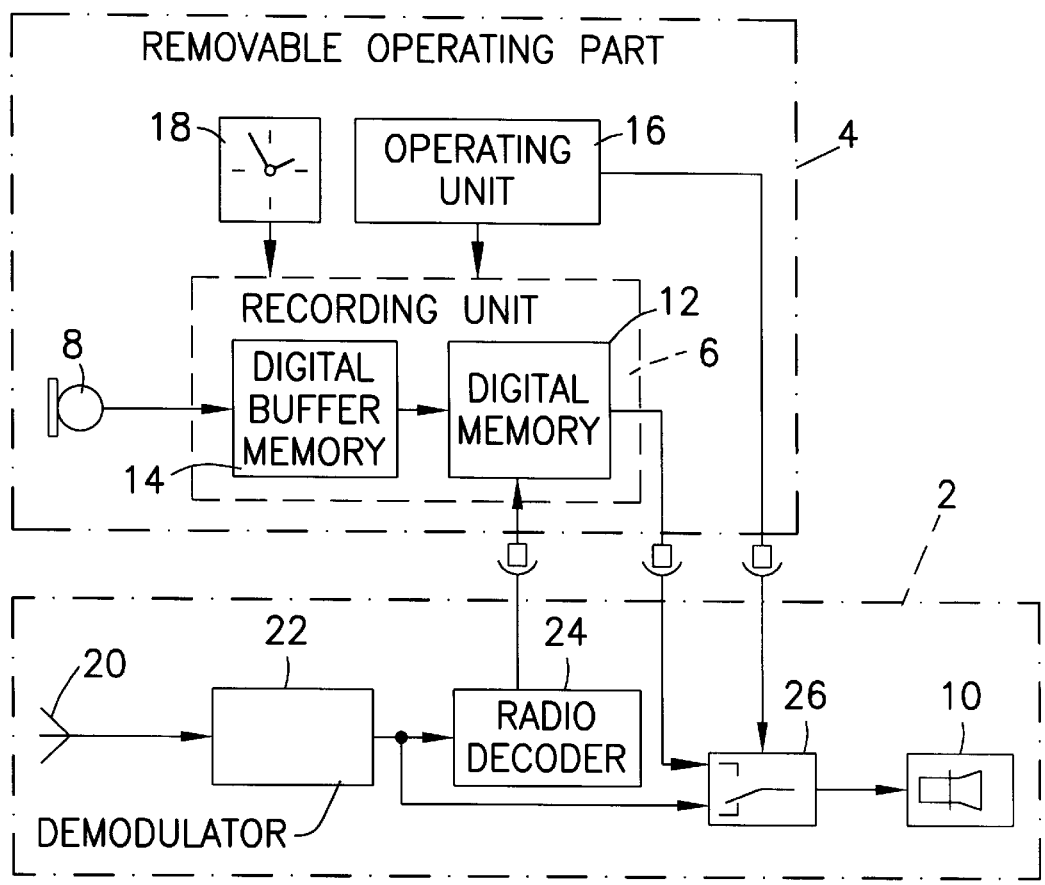
FIG. 2 is a block diagram of a radio receiver according to an exemplary embodiment of the present invention.

Operating part 4 has, in addition to the operating elements customary on car radios such as a volume control 32 and station buttons 34, a microphone 8. As shown in FIG. 2, the output signal of microphone 8 is fed to a recording unit 6 integrated in operating part 4. In the simplest case, recording unit 6 can be a tape recorder. In the present case, for example, recording unit 6 is designed as a digital recording unit formed in a known manner from an analog/digital converter, a digital memory 12 with associated controller and a digital/analog converter arranged on the output end. The details of recording unit 6 are not shown in the drawing.

Recording unit 6 is connected furthermore to an operating unit 16 of operating part 4. The operating unit 16 comprises, for example, operating elements 32, 34 for the functions of the car radio and also comprises operating elements 40, 42, 44 and 46 for operating recording unit 6. Moreover, operating unit 16 has an output unit in the form of a display 30. The display can be used, for example, to indicate the name or broadcast frequency of the transmitter station currently being received.

The output of recording unit 6 can be connected via previously mentioned contacts 52 to a first input of a changeover switch 26 provided in car radio 2. The output of switch 26 is connected to playback device 10 of car radio 2. The playback device 10 includes the known necessary means to play back the audio signals fed to it, particularly one or more amplifiers and loudspeakers, not shown in detail.

A second input of changeover switch 26 is connected to the output of a circuit unit 22, designated hereafter as the demodulator, for demodulation of the radio signal fed via an antenna 20. Circuit unit 22 comprises, for example, in a known manner the means, not shown, for receiving and for demodulating a radio signal fed from the antenna. The output of demodulator 22 is connected, moreover, to a circuit unit 24, designated hereafter as the traffic radio decoder, to detect identifiers accompanying traffic messages (announcement identifiers) and to forward the designated information. The identifiers designating the traffic messages are, particularly, those that are transmitted in accordance with the automobile-driver radio information (ARI) system or the radio data system (RDS) alongside the actual radio program on a broadcast frequency.

The function of the radio receiver of the present invention will now be described. Radio signals present at vehicle antenna 20, installed preferably at an exposed place on the vehicle, are demodulated in demodulator 22 connected to antenna 20 so that at the output of the demodulator the output signal, preferably in the form of a stereo multiplex signal, arises. In the normal operating state, this signal is forwarded via changeover switch 26 to playback unit 10 and reproduced.

In traffic radio decoder 24 connected to the output of demodulator 22, the demodulated signal is monitored for the occurrence of announcement identifiers and upon occurrence of such an identifier, the associated information is stored in a first area of memory 12 of recording unit 6 reserved for traffic information. By actuating a playback button 46 on operating part 4, the content of memory 12 can be output at any time via playback unit 10, memory 12 being connected via changeover switch 26 to playback unit 10 for this purpose.

With operating part 4 removed, car radio 2 is switched off and cannot be used due to missing operating part 4. However, operating part 4 can be used according to the present invention for recording audio signals, particularly as a dictation device. Recording of audio signals is not tied to operating part 4 being removed from car radio 2, but can also take place with the operating part attached and with the radio in operation. Due to the division of memory 12 into two areas, moreover, recording of audio signals via microphone 8 can take place even if traffic information is currently being written into the first memory area.

For example, to record an audio signal via microphone 8 integrated into operating part 4 according to the present invention, a recording button 40 is pressed on the operating part, whereupon the audio signal present at microphone 8 is converted in an analog-to-digital manner and written into a digital buffer memory 14 of recording unit 6. It can be provided to record a stereo signal, but since the capacity of the memories 12 and 14 of recording unit 6 may be limited, monophonic recording is provided in the exemplary embodiment according to the present invention.

If a signal segment (for example, a sentence of dictation) is perceived as acceptable by the user, this signal segment is transferred into the second reserved area of memory 12 of recording unit 6 by actuating memory button 44. However, if corrections are required, the content of buffer memory 14 can be erased with reset button 42 and the segment to be corrected can be rerecorded after actuating record button 40. By actuating memory button 44, the content of the buffer memory is stored behind a signal segment already present in memory 12 of recording unit 6.

To avoid overflow of memory 12 or also of buffer memory 14 due to an excessive data volume, display 30 indicates the amount of memory occupied and/or the remaining free capacity of the memory or memories. In the present exemplary embodiment, memory capacity is indicated in time units e.g., minutes. However, it is also possible to indicate the occupied, or rather free, memory capacity in terms of the overall capacity of the memory.

A warning message, via the display, can also be provided in case of an overflow of memory 12 due to an excessive data volume. Moreover, it is possible to overwrite the oldest signal segments stored in the memory with the new data.

Finally, the division between the first and the second area of memory 12 for traffic radio announcements and audio signals recorded via microphone can be canceled via a command on operating unit 16 so that the entire available capacity of memory 12 is available, for example, for a dictation.

By means of a clock 18 integrated in operating part 4, it is also possible to record the current time of day in addition to audio signals in response to a command on operating unit 16. This can then be indicated on display 30 of the car radio, for example, when playing back the recorded audio signals later.

To play back the audio data recorded in memory 12, a separate playback apparatus with amplifier and loudspeaker can be provided in operating part 4 of car radio. Due to the limited available room in operating part 4 and due to the limited energy reserves of the battery supplying the operating part, an integrated playback device is not used in the exemplary embodiment of the present invention. Instead, operating part 4 can be attached to car radio 2 to reproduce the recorded audio signals using playback unit 10. For this purpose, when playback button 46 on operating part 4 is actuated, the output of recording unit 6 is connected via changeover switch 26 to playback unit 10 and the audio signal stored in memory 12 of recording unit 6 is played back.

Alternatively, operating part 4 can be connected to a separate playback unit, for example, in the form of a stationary dictation device, for playback of the recorded signals.

For the case when operating part 4 is supplied with energy by a rechargeable battery, separate contacts 52 are provided on car radio 2 for charging the battery, the charging electronic circuitry being housed in car radio 2 and in operating part 4 to save space and weight.

What is claimed is:

1. A radio, comprising:

a radio receiver;

an operating part removably attached to the radio receiver;

a recording unit disposed within the operating part;

a microphone connected to the recording unit and disposed within the operating part; and a circuit arrangement connected to the recording unit when the operating part is attached to the radio receiver, the circuit arrangement detecting identifiers designating information transmitted via a received radio program, wherein the recording unit includes a memory, the memory including a first memory area and a second memory area, the first memory area being separate from the second memory area, the first memory area storing information transmitted with the received radio program and received from the circuit arrangements the second memory area storing audio data received via the microphone, and wherein the recording unit is capable of storing the audio data in the second memory area even when the operating part is detached from the radio receiver.

2. The radio according to claim 1, wherein the audio data received via the microphone includes speech information.

3. The radio according to claim 1, further comprising an operating unit connected to the recording unit and disposed within the operating part, the operating unit canceling a separation of the first separate memory area from the second memory area upon receiving an input command.

4. The radio according to claim 1, further comprising a rechargeable battery disposed within the operating part, the rechargeable battery supplying power to the operating part when the operating part is separated from the radio receiver.

5. The radio according to claim 1, further comprising a playback unit disposed within the radio receiver, the playback unit playing back the audio data recorded with the recording unit when the operating part is attached to the radio receiver and the recording unit is connected to the playback unit.

6. The radio according to claim 1, further comprising a separate playback unit connected to the operating part to play back the audio data recorded with the recording unit.

7. The radio according to claim 1, wherein the operating part includes a recording button and a memory button, wherein the recording unit further includes a buffer memory, wherein the recording button is actuated to activate a recording of the audio data received via the microphone into the buffer memory, and wherein the memory button is actuated to activate a storage of a content of the buffer memory into the memory.

8. The radio according to claim 7, wherein the operating part includes a reset button, the reset button being actuated for erasing the content of the buffer memory.

9. The radio according to claim 3, further comprising a clock connected to the recording unit, the clock storing a current time of day in the recording unit in response to an entry via the operating unit.

10. The radio according to claim 1, wherein the operating part further includes an indicator, the indicator indicating at least one of a duration of a recording and a remaining free capacity of the memory.

11. The radio according to claim 1, wherein the operating part is connected to an external playback unit which is not connected to the radio receiver, the playback unit playing back the audio data.

* * * * *